United States Patent [19]

Smith et al.

[11] 4,099,594

[45] Jul. 11, 1978

[54] TONGUE-MOUNTED ASSEMBLY FOR SUPPORTING AN IMPLEMENT DRIVELINE

[75] Inventors: Kenneth E. Smith, Strasburg; Floyd L. Myer, New Holland, both of Pa.

[73] Assignee: Sperry Rand Corporation, New Holland, Pa.

[21] Appl. No.: 721,270

[22] Filed: Sep. 8, 1976

[51] Int. Cl.² .............................................. F16D 3/00
[52] U.S. Cl. ..................................... 180/14 B; 64/23; 74/15.69
[58] Field of Search .................... 180/14 B, 14 R, 14.5

[56] References Cited

U.S. PATENT DOCUMENTS

| 1,827,070 | 10/1931 | Coultas et al. | 180/14 R |
|---|---|---|---|
| 1,898,114 | 2/1933 | Zink | 180/14 R |
| 1,999,841 | 4/1935 | MacGregor | 180/14 R |
| 2,427,824 | 9/1947 | Vutz | 180/14 R |
| 2,744,374 | 5/1956 | Louthan | 180/14 R |
| 3,557,892 | 1/1971 | Burrough | 180/14 R |
| 3,908,398 | 9/1975 | Braunberger | 180/14 B |
| 4,020,913 | 5/1977 | Yatcilla | 180/14 R |

FOREIGN PATENT DOCUMENTS

| 992,285 | 1951 | France | 180/14 R |
|---|---|---|---|

*Primary Examiner*—Joseph F. Peters, Jr.
*Assistant Examiner*—Donn McGiehan
*Attorney, Agent, or Firm*—John B. Mitchell; Frank A. Seemar; Joseph A. Brown

[57] ABSTRACT

An improved assembly is mounted on a tongue of a draft implement which supports an input driveline of the implement for operative drive connection with a power takeoff drive shaft of a tractor which tows the implement through an articulate connection with the implement tongue. The improved assembly includes a lower toothed annular jaw part fixedly mounted on a support member on the tongue, an upper toothed annular jaw part and a shaft extending generally vertically through the lower and upper jaw parts and journalling the upper jaw part for rotation relative to the lower jaw part about an upright axis and for concurrent axial sliding movement toward and away from an intermeshed relationship with the lower jaw part. The assembly further includes a generally horizontal arm which is rigidly connected to the upper jaw part for movement therewith and is interconnected to and supports the driveline, and a spring which urges the shaft downwardly so as to dispose the upper jaw part in the intermeshed relationship with the lower jaw part such that the arm thereby disposes the driveline in a longitudinal position. The spring is yieldable to allow the upper jaw part to concurrently rotate relative to, and axially slide away from the intermeshed relationship with, the lower jaw part such that the arm will pivot laterally and allow lateral movement of the driveline therewith to accommodate sharp turns of the tractor relative to the implement.

4 Claims, 10 Drawing Figures

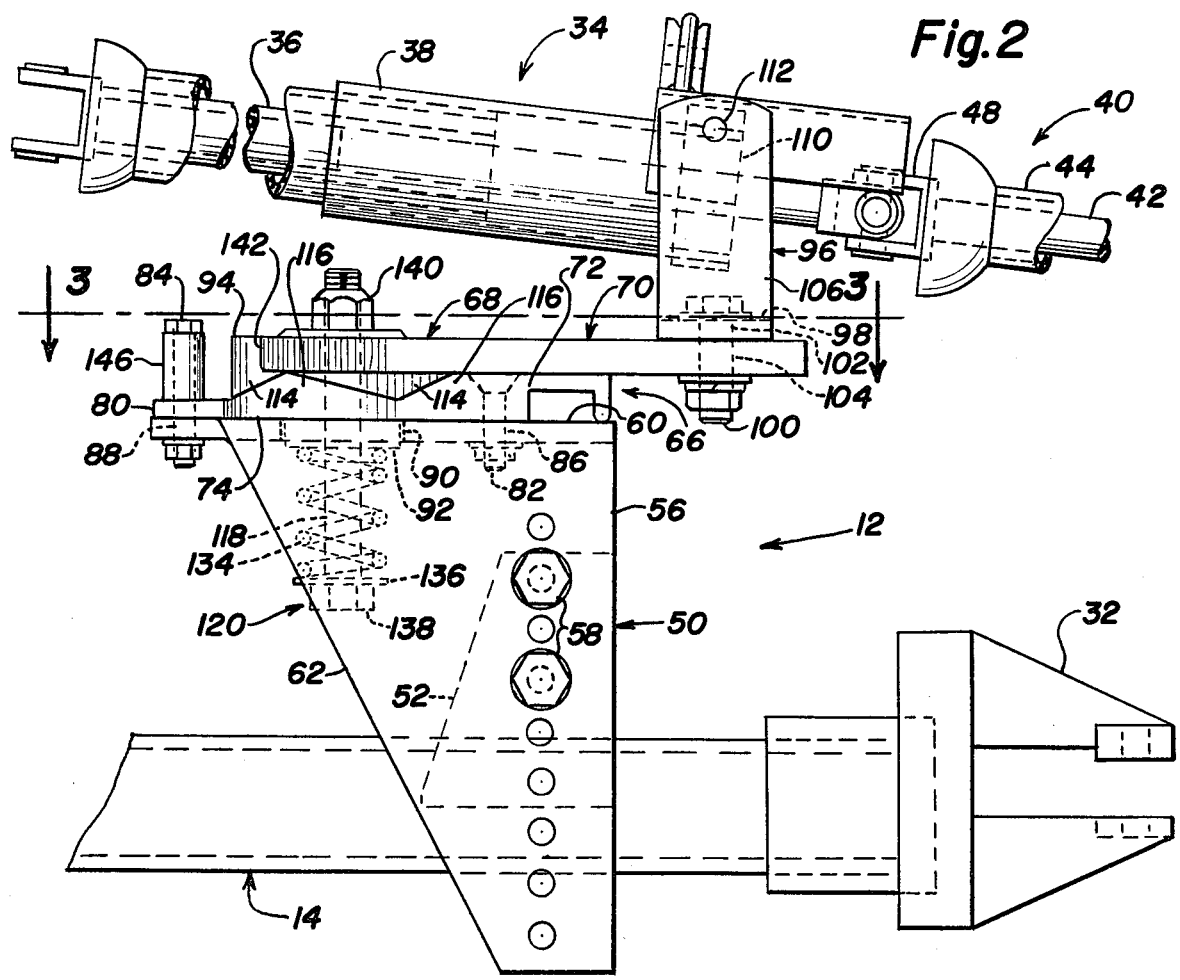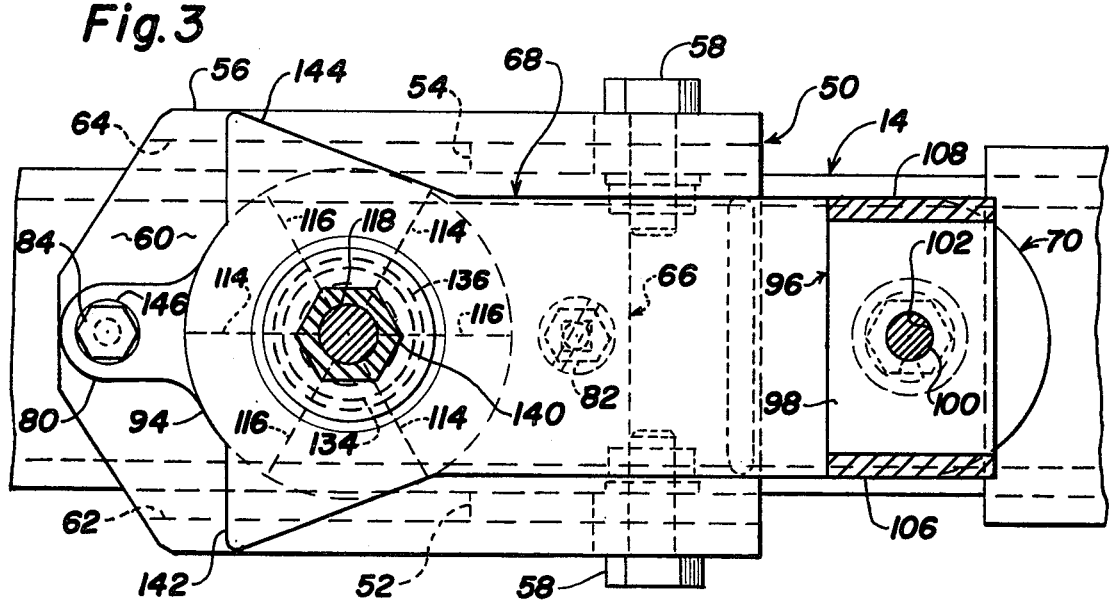

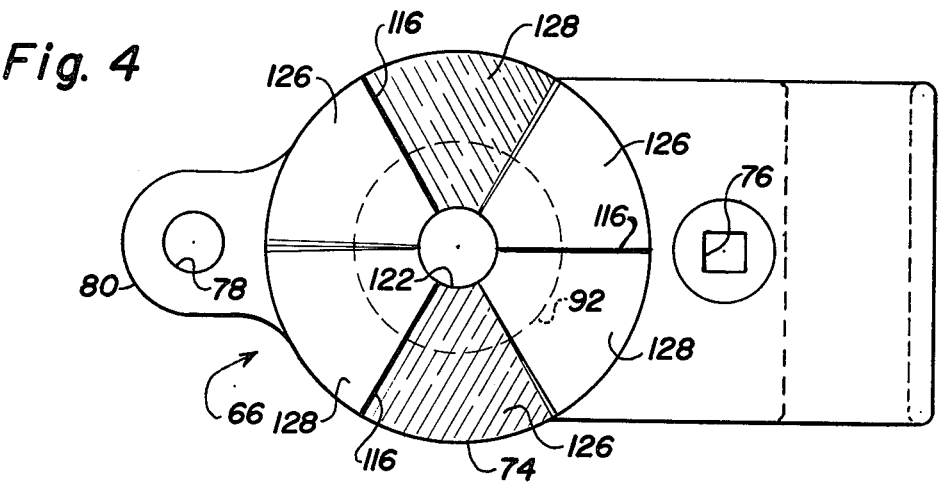
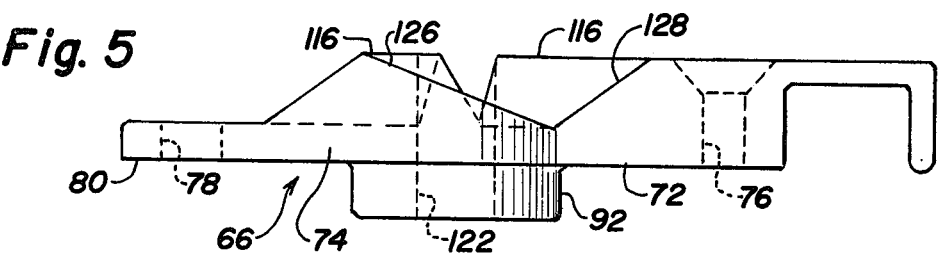
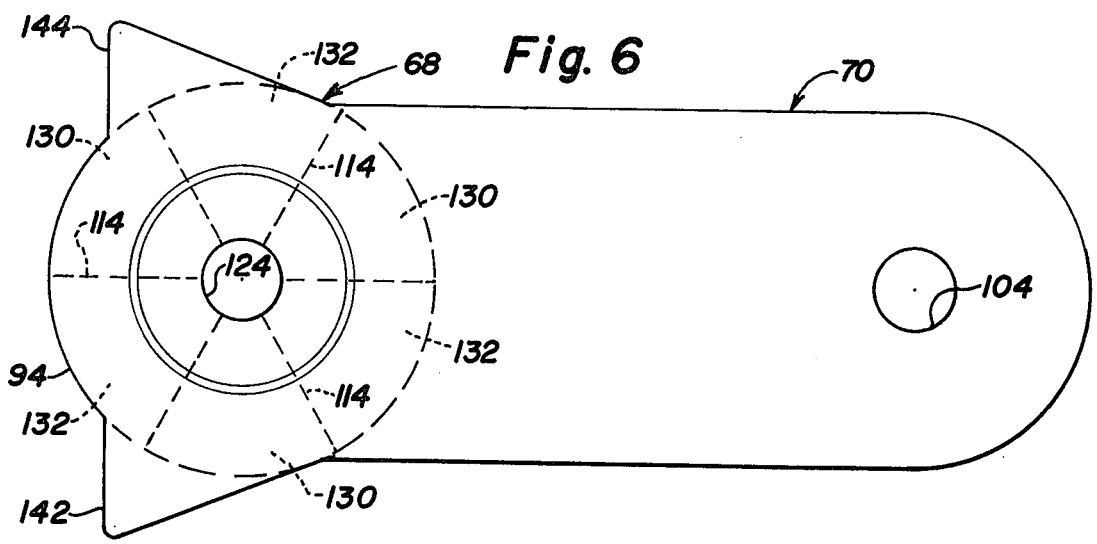
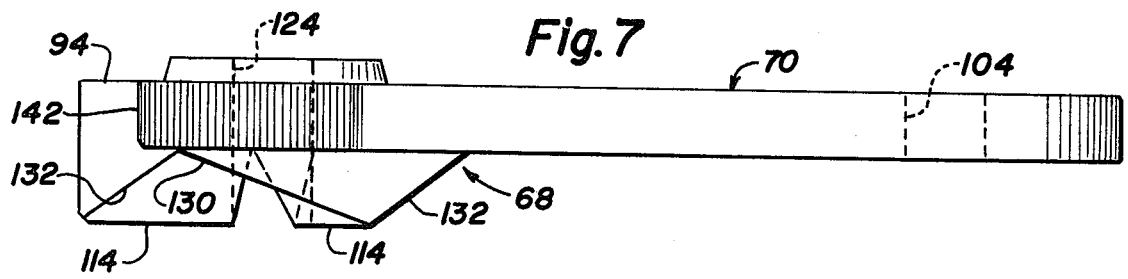

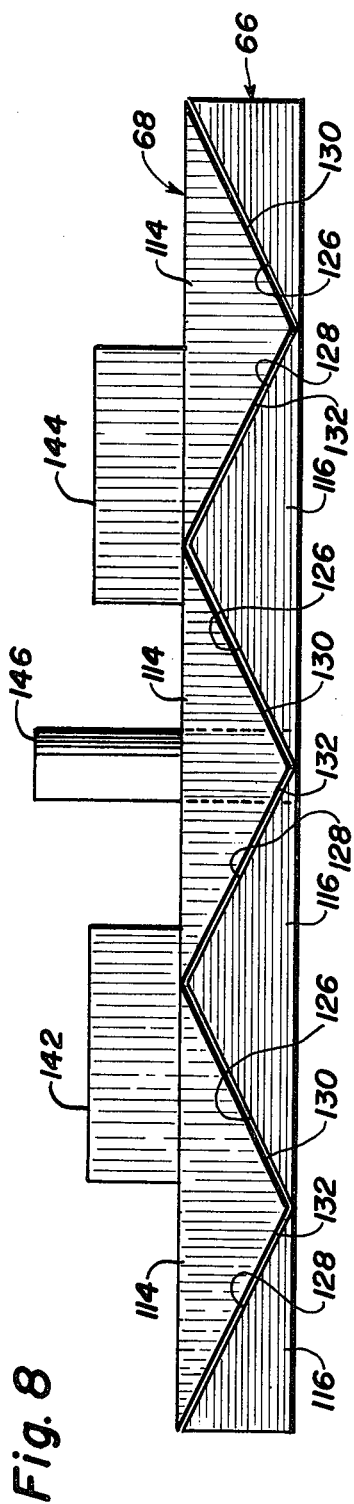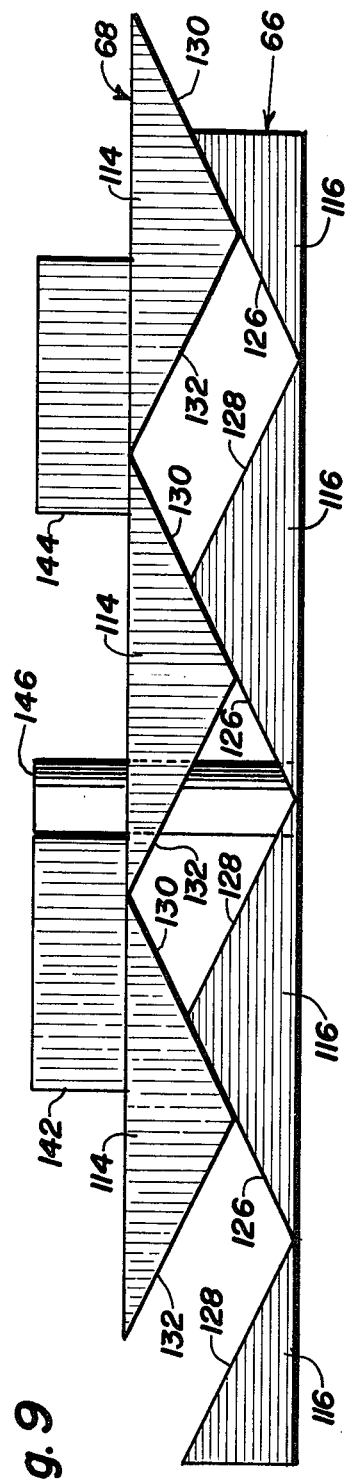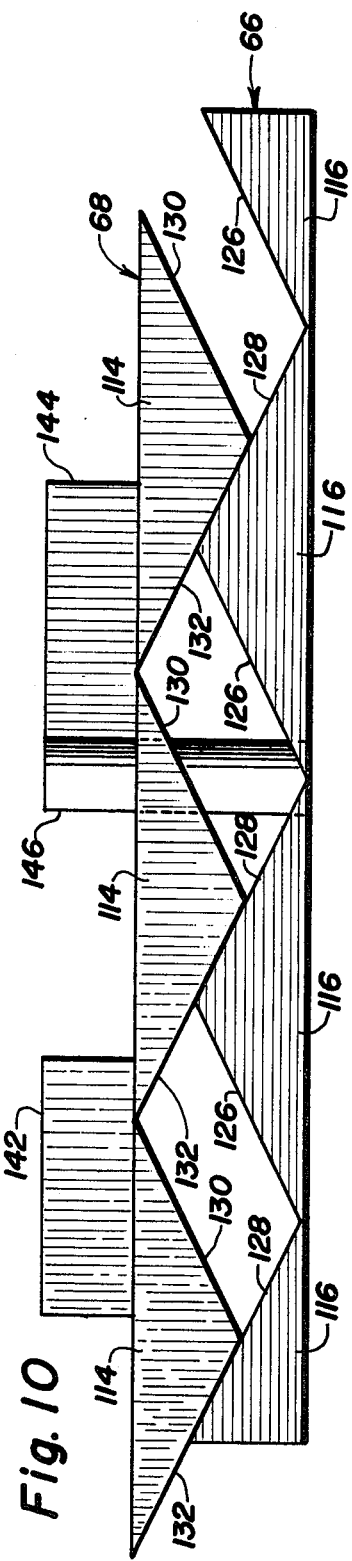

TONGUE-MOUNTED ASSEMBLY FOR SUPPORTING AN IMPLEMENT DRIVELINE

BACKGROUND OF THE INVENTION

1. Field of the Invention

The present invention relates generally to draft implements of the type having an input driveline connected to and powered by a power takeoff shaft of the towing vehicle and, more particularly, is concerned with an improved assembly for supporting the implement driveline so as to accommodate bottoming out of a telescoping assembly in the driveline during sharp turns of the tractor relative to the implement.

2. Description of the Prior Art

Balers, mower-conditioners and other agricultural pull-type implements commonly have a tongue which is adapted to be articulately connected at its hitch end to the drawbar of a tractor. Also, such implements commonly have an input driveline adapted to be connected to the power takeoff shaft of the tractor for transmitting rotary power to the operating components of the implement. The implement driveline frequently includes a forward telescoping drive assembly located above the tongue hitch end and the tractor drawbar which is articulately coupled to the tractor power takeoff shaft by a forward universal joint located forwardly of the connection of the hitch end to the drawbar and articulately coupled to the remainder of the driveline by a rear universal joint located rearwardly of the connection of the hitch end to the drawbar.

During turns of the tractor relative to the implement, if the angle of articulation at the forward universal joint is substantially different than the angle of articulation at the rear universal joint, the rotary speed of the implement driveline will fluctuate relative to the tractor pto shaft rotary speed. The resulting speed variations in the implement driveline are, of course, highly undesirable and produce wear and excessive vibration in the implement driveline.

Therefore, it is desirable to keep the forward and rear universal joint angles as nearly equal as possible during articulation of the tractor relative to the implement. This makes it necessary to make the distance from the rear universal joint to the point of connection between the implement tongue and the tractor drawbar the same as the distance from the forward universal joint to such connection point. It is a standard in the tractor industry, for instance, at 540 rpm power takeoff speeds, that the forward universal joint be approximately 11 11/16 inches from the tongue hitch/drawbar connection point. Thus, when the implement is designed to provide this same distance between the rear universal joint and the tongue hitch/drawbar connection point, the result is that the telescoping drive assembly intercoupled between the forward and rear universal joints has a relatively short length. Since the telescoping parts of the assembly must be capable of extending and retracting as the tractor turns or articulates relative to the implement during field operation and must be long enough so as not to separate during field operation, the assembly will generally bottom out at tractor/implement turning angles which are smaller, or less sharp, than will be required for efficient field operation of the implement.

SUMMARY OF THE INVENTION

The improved implement driveline support assembly provided by the present invention positions the driveline of the implement such that the rear universal joint of the forward telescoping assembly of the driveline is disposed the same distance rearwardly of the tractor/implement articulate connection point as that at which the forward universal joint of the telescoping assembly is positioned forwardly of the connection point. Therefore, equal angles at the forward and rear universal joints of the telescoping assembly with the implement hitch and tractor drawbar are maintained during most turns of the tractor relative to the implement.

During sharper turns of the tractor relative to the implement which cause bottoming out between the shaft parts of the telescoping assembly, the improved driveline support assembly, due to the axially-directed forces imposed on the universal joints by the bottomed-out telescoping assembly, yields and allows the driveline to move laterally in a direction opposite from the turning direction of the tractor relative to the implement, whereby the bottoming out of the telescoping assembly is accommodated without deleterious consequences on the driveline. During the lateral yielding movement of the driveline, the aforementioned angles of articulation at the forward and rear universal joints become somewhat unequal. However, the different between the angles is so slight that no severe speed variation in the implement driveline is encountered.

Once the tractor is re-articulated away from the sharp turning angle relative to the implement and the bottomed-out condition of the telescoping assembly is relieved, the improved driveline support assembly returns the driveline to its original position in which the forward and rear universal joints of the telescoping assembly are equidistantly displaced from the tractor/implement articulate connection point.

Accordingly, the present invention broadly relates to an improved driveline support assembly incorporated in a draft or pull-type implement, such as a baler. The implement has an input power driveline and a tongue adapted to be articulately connected to a tractor or the like for pulling the implement across a field. The driveline includes a telescoping drive assembly, a forward universal joint for articulately coupling said telescoping assembly to a power takeoff shaft of the tractor at a location forwardly of said articulate connection point of the implement tongue to the tractor and a rear universal joint for articulately coupling the telescoping assembly to the remainder of the driveline at a location rearwardly of the articulate connection point of the implement tongue to the tractor, the forward and rear universal joints being equidistantly displaced from the implement/tractor articulate connection point.

The improved driveline support assembly includes a lower jaw part fixedly mounted on a support member on the tongue, an upper jaw part and a shaft extending generally vertically through the lower jaw part and the upper jaw part. The shaft journals the upper jaw part for rotation relative to the lower jaw part about a upright axis and for concurrent axial sliding movement toward and away from an intermeshed relationship with the lower jaw part. The improved assembly further includes a generally horizontal arm which is rigidly connected to the upper jaw part for movement therewith and is interconnected to and supports the driveline. Also, resilient means in the form of a spring is provided which urges the shaft downwardly so as to dispose the upper jaw part in the intermeshed relationship with the lower jaw part such that the arm thereby disposes the implement driveline in a longitudinal position.

The spring is yieldable to allow the upper jaw part to concurrently rotate relative to, and axially slide away from the intermeshed relationship with, the lower jaw part such that the arm will pivot laterally and allow lateral movement of the driveline therewith to accommodate sharp turns of the tractor relative to the implement. The spring acts to restore the jaw parts to their intermeshed relationship upon re-articulation of the tractor out of its sharp turn relative to the implement.

More particularly, each of the jaw parts includes a plurality of radially and outwardly projecting teeth, with the teeth on the upper jaw part extending toward and interengaged with the teeth on the lower jaw part when the jaw parts are disposd in the intermeshed relationship. Each of the teeth of the upper jaw part are defined by a pair of sloping cam surfaces being formed thereon in opposed relationship to another pair of sloping cam surfaces which define each of the teeth on the lower jaw part. The respective pairs of cam surfaces on the upper and lower jaw parts extend radially from the generally upright axis defined by the shaft.

As the upper jaw part rotates relative to the lower jaw part, the one cam surface in each of the upper pairs thereof slides upwardly relative to and upon the opposing one cam surface in each of the lower pairs thereof. However, stop means is provided, being operative to limit rotation of the upper jaw part relative to the lower jaw part so as to preclude the teeth of the upper jaw part from indexing to a new intermeshing relationship relative to teeth of the lower jaw part. The stop means, preferably, includes a pair of angularly spaced apart ears projecting horizontally from the upper jaw part and an upstanding stop element mounted adjacent the lower jaw part and between the ears such that when the upper jaw part rotates in either of two opposite directions relative to the lower jaw part one of the ears will abut the stop element and prevent further rotation of the upper jaw part before its cam surfaces slide out of engagement with preselected opposing lower cam surfaces of the lower jaw part.

The advantages and attainments of the improved driveline support assembly provided by the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIG. 2 is an enlarged, fragmentary right side elevational view of the baler tongue, driveline and improved driveline support assembly;

FIG. 3 is an enlarged top plan view, partly in section, of the improved driveline support assembly taken along line 3—3 of FIG. 2;

FIG. 4 is a top plan view of the lower jaw part of the improved support assembly, on a somewhat larger scale than that of FIG. 3;

FIG. 5 is a right side elevational view of the lower jaw part of FIG. 4;

FIG. 6 is a top plan view of the upper jaw part and integrally-connected arm of the improved support assembly, on a somewhat larger scale than that of FIG. 3;

FIG. 7 is a right side elevational view of the upper jaw part and arm of FIG. 6;

FIG. 8 is a diagrammatic side representation of the outer peripheral profiles of the annular-shaped jaw parts of the improved support assembly, showing the jaw parts in their intermeshed relationship as seen in FIG. 3 and also the stop element disposed between and equidistantly spaced from the ears on the upper jaw part;

FIG. 9 is a diagrammatic side representation similar to that of FIG. 8, but showing the upper jaw part at its maximum clockwise rotational position relative to the lower jaw part when viewed as in FIG. 3, the limit of such clockwise rotation of the upper jaw part being defined by abutment of the right ear against the stop element; and FIG. 10 is a diagrammatic side representation similar to that of FIG. 8, but showing the upper jaw part at its maximum counterclockwise rotational position relative to the lower jaw part when viewed as in FIG. 3, the limit of such counterclockwise rotation of the upper jaw part being defined by abutment of the left ear against the stop element.

DETAILED DESCRIPTION OF THE INVENTION

Figure 1:
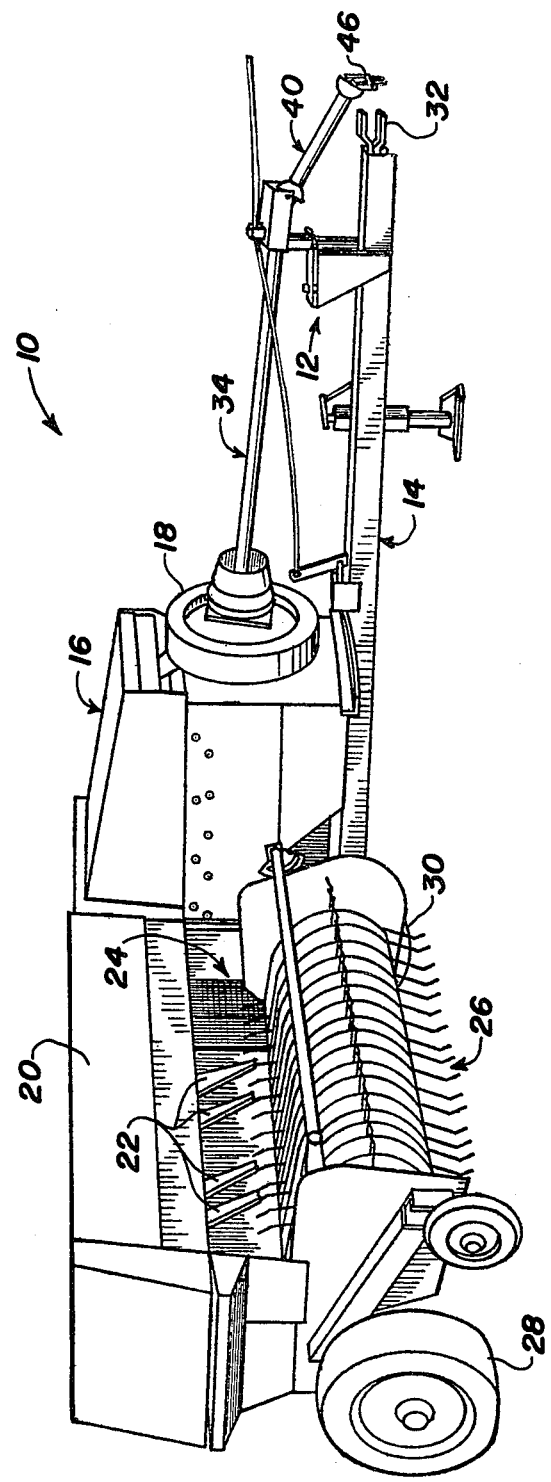
FIG. 1 is a perspective view of a baler incorporating the improved driveline support assembly of the present invention.

In the following description, right hand and left hand references are determined by standing at the rear of the baler and facing in the direction of forward travel. Also, in the following description, it is to be understood that such terms as "forward," "rearward," "left," "upwardly," etc., are words of convenience and are not to be construed as limiting terms.

IN GENERAL

Referring now to the drawings, and particularly to FIG. 1, there is shown a hay baler, being indicated generally by numeral 10, incorporating the preferred embodiment of the improved driveline support assembly, designated by numeral 12, of the present invention. While the support assembly 12 is illustrated on a hay baler, it should be understood that the support assembly 12 is applicable to other pull-type or draft implements, such as mower-conditioners, forage harvesters, etc.

The baler 10 includes a tongue 14 extending forwardly of the baler for attachment to a tractor (not shown), a fore-and-aft extending bale case or chamber 16 having a forward end on which a flywheel 18 is rotatably mounted, a feeder housing 20 transversely located adjacent the right side of the bale chamber 16 within which is mounted a feeding mechanism 22 adapted to convey crop material into the bale chamber 16 through inlet opening 24, and a rotatable pickup 26 mounted on the baler 10 forwardly of and below the feeder housing 20 and adapted to lift crop material from the field and deliver it to the feeding mechanism.

A plunger (not shown) is mounted for reciprocable movement in the bale chamber 16 for forming the crop material conveyed therein through inlet opening 24 into rectangular bales. As the bales are formed in the bale chamber 16, they move progressively toward the rear end of the bale chamber 16. After each bale is completed, it is banded with a suitable tying medium and, subsequently, emerges from the rear or discharge end of the bale chamber 16.

The baler 10 is supported by right and left ground-engaging wheels 28, 30 and, when articulately connected at a hitch end 32 of its tongue 14 to the drawbar of the tractor, it may be towed across a field.

An input driveline, generally designated by numeral 34, being connected at its rear end to the baler flywheel 18, is adapted for connection at its forward end to the power takeoff (pto) shaft (not shown) of the tractor for rotation in unison therewith to supply rotary driving power to the operating components of the baler 10 through additional power transmitting components (not shown).

Referring now also to FIG. 2, the driveline 34 includes rear input telescoping drive shaft 36, being positioned above and generally extending along the baler tongue 14 and covered by a telescoping shield 38, and a forward drive assembly, generally designated as 40. The forward drive assembly 40 is comprised by a telescoping drive assembly, formed by front and rear telescoping shaft parts 42 (only the rear telescoping shaft part being shown) being covered by a telescoping shield 44, and forward and rear universal joints 46, 48 for respectively articulately coupling the front and rear ends of the forward drive assembly 40 to the tractor pto shaft and the forward end of the input telescoping drive shaft 36.

IMPROVED DRIVELINE SUPPORT ASSEMBLY

The driveline 34 just rearwardly of its rear universal joint 48 is supported generally above the baler tongue 14 by the improved driveline support assembly 12 of the present invention so as to be normally positioned the same distance rearwardly of the tractor/implement articulate connection as that at which the forward universal joint 48 would be positioned forwardly of the articulate connection.

As illustrated in detail in FIGS. 2 and 3, the improved support assembly 12 includes a first upright support member 50 having a lower pair of braces 52, 54 and an upper, generally U-shaped bracket 56 which fits over the lower braces 52, 54 and is fastened thereto by bolts 58. The lower pair of braces 52, 54 are secured at their lower ends to the respective sidewalls of the tongue 14 and extend upwardly therefrom. The upper bracket 56 is formed by a top plate 60 from the opposing side edges of which respectively depend a pair of side plates 62, 64 which respectively extend along the outer faces of the braces 52, 54 and are fastened thereby by the bolts 58. The rear edges of the side plates 62, 64 taper from the top plate 60 forwardly and downwardly to thereby provide the upper bracket 56 with a rearwardly projecting configuration. Also, the height of the upper bracket 56 above the pair of lower braces 52, 54 and thus above the tongue 14 may be adjusted by removing the bolts 58, raising or lowering the upper bracket 56 as desired so as to align pairs of holes formed through the braces 52, 54 with the appropriate pairs of holes in the vertically aligned rows thereof formed through the side plates 62, 64 of the upper bracket 56 and then re-fastening the bolts 58 therethrough.

As seen in FIGS. 2 through 7, the improved support assembly 12 further includes lower and upper jaw parts 66, 68 and an elongated arm 70 integrally connected at one end with the upper jaw part 68. The lower jaw part 66 includes a forward base portion 72 and a rear annular portion 74 integrally connected with one end of the base portion 72. A forward hole 76 is formed through the base portion 72 and a rear hole 78 is formed through a rearwardly protruding tab 80 integrally formed on the rear side of the annular portion 74. The lower jaw part 66 is supported on the top plate 60 of the upper bracket 56 and secured thereto by bolts 82, 84 fastened respectively through forward and rear holes 86, 88 formed in the top plate 60 and aligned with forward and rear holes 76, 78 in the lower jaw part 66. Furthermore, a large diameter opening 90 is formed in the top plate 60 just forwardly of the rear hole 88 and receives therethrough an annular-shaped hub 92 formed integrally on and depending from the bottom side of the rear annular portion 74 of the lower jaw part 66. The upper jaw part 68 has an annular portion 94 which is disposed above the rear annular portion 74 of the lower jaw part 68, with the arm 70 extending horizontally above the forward base portion 72.

The improved support assembly 12 also includes a second upright support member 96 having a U-shaped configuration. The member 96 has a horizontal base 98 rotatably fastened about a vertical axis to the forward end of the arm 70 by a bolt 100 which is fastened through aligned openings 102, 104 formed in the horizontal base 98 and the forward end of the arm 70. The member 96 also has a pair of upstanding legs 106, 108 between the top ends of which is fastened a bearing block 110. The block 110 is mounted for rotation about a horizontal axis defined by bolt 112 to accommodate the driveline 34 to vertical adjustment of the upper bracket 56 relative to the tongue 14. The block 110 has a central bore through which the input telescoping drive shaft 36 is received and rotatably mounted rearwardly of the rear universal joint 48 of the driveline 34. When the arm 70 is disposed in its normal centered position, as seen in FIG. 3, the input driveline 34 is disposed in a longitudinal position such that the rear universal joint 48 and forward universal joint 46 will be disposed equidistantly from the tractor/implement articulate connection point.

The arm 70 is disposed in its normal centered position when a plurality of teeth 114 integrally formed on the annular portion 94 of the upper jaw part 68 are intermeshed with a plurality of teeth 116 integrally formed on the annular portion 74 of the lower jaw part 66. Furthermore, the improved support assembly 12 includes shaft means in the form of a stem 118 of a bolt 120 which extends generally vertically through respective central bores 122, 124 formed through the annular portions 74, 94 of the lower and upper jaw parts 66, 68. The bolt 120 journals the upper jaw part 68 for rotation relative to the lower jaw part 66 about an upright axis defined by the stem 118 of the bolt 120. Also, because the respective teeth 114, 116 of the jaw parts 66, 68, there being preferably three teeth in each plurality thereof, project radially from the upright axis and outwardly from the annular portions 74, 94 and are respectively defined by opposing pairs of planar sloping cam surfaces 126, 128 and 130, 132, the upper jaw part 68 axially moves away from the lower jaw part 66 concurrently as the former is rotated relative to the latter.

The teeth 114, 116 of the upper and lower jaw parts 68, 66 are normally maintained in the intermeshed relationship, as seen in FIGS. 2 and 3, and thus the arm 70 is disposed in its normal centered position by resilient means in the form of a compression spring 134 which coils about the stem 118 of the bolt 120 and is confined between the bottom side of the depending annular hub 92 on the fixed lower jaw part 66 and a washer 136 inserted on the stem 118 against the head 138 of the bolt 120. A nut 140 applied on the upper threaded end of the stem 118 engages the top side of the upper jaw part 68 and the force of the spring 134 which urges the bolt 120 and thereby the upper jaw part 68 toward the lower jaw part 66 and yieldably clamps the respective teeth 114, 116 thereof in the intermeshed relationship may be adjusted by tightening or loosening the nut 140 as desired.

When the spring 130 yields (becomes more compressed) as the upper jaw part 68 rotates relative to the lower jaw part 66, one cam surface (either 130 or 132 depending upon the direction of rotation of the upper jaw part 68) in each of the upper three pairs thereof slides upwardly relative to and upon the opposing one cam surface (either 126 or 128) in each of the lower three pairs thereof. However, stop means is provided by the improved support assembly 12, being operative to limit rotation of the upper jaw part 68 relative to the lower jaw part 66 so as to preclude the teeth 114 of the upper jaw part 68 from indexing to a new intermeshing relationship relative to the teeth 116 of the lower jaw part 66. The stop means, preferably, includes a pair of angularly spaced apart ears 142, 144 projecting horizontally and outwardly from the annular portion 94 of the upper jaw part 68 and an upstanding stop element 146 in the form of a sleeve mounted by the bolt 84 on the rearwardly protruding tab 80 of the lower jaw part 66 and disposed between and equidistantly spaced from the ears 142, 144, as seen in FIGS. 2 and 8.

OPERATION

As mentioned hereinbefore, the spring 134 of the improved support assembly 12 maintains the teeth 116, 114 of the jaw parts 66, 68 in their intermeshed relationship as seen in FIG. 8, and the arm 70 in its centered position as seen in FIGS. 2 and 3 such that the rear universal joint 48 is maintained the same distance rearwardly from the tongue/tractor articulate connection point as that of the forward universal joint 46 forwardly therefrom. Such equidistant arrangement is maintained until bottoming out occurs between the shaft parts 42 of the front telescoping drive assembly 40. Such bottoming out does not occur during tractor-to-implement turning angles less than approximately 75° (relative to the forward direction). Therefore, the articulation angles at the forward and rear universal joints 46, 48 remain relatively equal during less than 75° turns of the tractor relative to the implement. The above-described positional relationship of the front and rear universal joints relative to the tongue/tractor articulate connection point, as well as, the bottoming out of the telescoping assembly will be readily understood by those skilled in the art and need not be illustrated herein for a complete and thorough understanding of the present invention, the operation of which is schematically represented in FIGS. 8 through 10.

When the tractor-to-implement turning angles exceed approximately 75°, then axially-directed forces are imposed on the universal joints 46, 48 by the bottomed-out telescoping assembly 40. If both of the universal joints 46, 48 were rigidly anchored, then continued turning of the tractor relative to the implement beyond the 75° limit would result in damage to one or both of the universal joints. However, the axial force on the rear universal joint 48 substantially instantaneously will exceed the biasing force of the spring 134 imposed on the bolt 120 and thereby on the upper jaw part 68 which maintains the teeth 114 thereof in intermeshed relationship with the teeth 116 of the lower jaw part 66 and the arm 70 in its centered position. Consequently, the spring 134 yields, allowing the arm 70 to laterally pivot from its centered position either to the left or right thereof which allows the driveline 34 to correspondingly laterally move and accommodate the bottomed-out condition of telescoping assembly 40. The lateral pivotal movement of the arm 70 and corresponding lateral movement of the driveline 34 will be in a direction opposite to the direction in which the tractor is turned relative to the implement.

When the arm 70 and driveline 34 laterally move to the right of the tongue 14 as viewed in FIG. 3, the cam surfaces 130 of the teeth 114 of the upper jaw part 68 slide upwardly relative to and upon the opposing cam surfaces 126 of the teeth 116 of the lower jaw part 66 from the intermeshed relationship of the teeth 114, 116 as seen in FIG. 8 toward the one limit position as seen in FIG. 9. It will be observed that right lateral pivoting of the arm 70 will be halted when the right ear 142 on the upper jaw part 68 abuts against the stop element 146 so as to prevent the upper teeth 114 from indexing into a new intermeshing relationship with the lower teeth 116.

When the arm 70 and driveline 34 laterally move to the left of the tongue 14 as viewed in FIG. 3, the cam surfaces 132 of the teeth 114 of the upper jaw part 68 slide upwardly relative to and upon the opposing cam surfaces 128 of the teeth 116 of the lower jaw part 66 from the intermeshed relationship of the teeth 114, 116 as seen in FIG. 8 toward the opposite limit position as seen in FIG. 10. Also, it will be observed that left lateral pivoting of the arm 70 will be halted when the left ear 144 on the upper jaw part 68 abuts against the stop element 146 so as to prevent the teeth 114 from indexing into yet another new intermeshing relationship with the lower teeth 116.

Once the tractor is turned back toward a relative forward alignment with the implement such that the turning angle decreases below 75°, bottoming out of the telescoping assembly 40, and thus the axial force caused thereby, is relieved, the downwardly-directed biasing force of the spring 134 will cause the upper jaw part 68 to rotate back to the position of FIGS. 3 and 8 and the arm 70 to pivot back to its centered position of FIG. 3 which returns the driveline 34 back to its initial longitudinal position.

It will be seen that the teeth 114, 116 in each of the respective pluralities thereof on the upper and lower jaw parts 68, 66 in being angularly displaced at equal degrees one from the next about the upright rotational axis defined by the bolt 120 provide a more stable arrangement for supporting the arm 70 and driveline 34 during respective lateral movements thereof, as well as, defining a more positive "home" position therefor than has been the case with prior art driveline support assemblies known heretofore.

It is thought that the improved driveline support assembly provided by the present invention and many of its attendant advantages will be understood from the foregoing description and it will be apparent that various changes may be made in the form, construction and arrangement of the parts thereof described without departing from the spirit and scope of the invention or sacrificing all of its material advantages, the form hereinbefore described being merely an exemplary embodiment thereof.

Having thus described the invention, what is claimed is:

1. An improved assembly mounted on a tongue of a draft implement having an input driveline, said assembly normally supporting said driveline in a predetermined longitudinally extending position for operative drive connection with a power shaft of a tractor or the like which tows the implement through an articulation connection with the implement tongue, said assembly comprising:

support means on the implement tongue;

a lower jaw part fixedly mounted on said support means;

an upper jaw part;

shaft means extending generally vertically through said lower jaw part and journalling said upper jaw part for rotation relative to said lower jaw part about a generally upright axis and for concurrent axial sliding movement toward and away from an intermeshed relationship with said lower jaw part;

each of said jaw parts includes a plurality of teeth extending radially from said upright axis defined by said shaft means and projecting outwardly, the teeth on said upper jaw part extending toward and interengaged with the teeth on said lower jaw part when said jaw parts are disposed in said intermeshed relationship;

a generally horizontal arm rigidly connected to said upper jaw part for movement therewith and being interconnected to and supporting said driveline; and resilient means for urging said upper jaw part downwardly toward said lower jaw part so as to normally maintain the teeth of said upper jaw part in the intermeshed relationship with the teeth of said lower jaw part such that said arm will support said driveline in said predetermined longitudinal position, said resilient means being yieldable to allow said upper jaw part to concurrently rotate relative to, and axially slide away from said intermeshed relationship upon said lower jaw part between predetermined angularly displaced limits such that said arm will pivotally move laterally and allow lateral movement of said driveline therewith to accommodate sharp turns of the tractor relative to the implement; said predetermined angularly displaced limits between which said upper jaw part may rotate relative to said lower jaw part are defined by a pair of angularly spaced apart elements projecting from said upper jaw part and a stop element stationarily mounted adjacent said lower jaw part spaced between and in the path of movement of said projecting elements with said upper jaw part so as to preclude said teeth on said upper jaw part from indexing into a new intermeshing relationship relative to said teeth on said lower jaw part when said upper jaw part is rotated.

2. An improved assembly as recited in claim 1, wherein each of said teeth of said upper jaw part is defined by a pair of planar sloping cam surfaces being formed thereon in opposed relationship to another pair of planar sloping cam surfaces which define each of said teeth on said lower jaw part.

3. An improved assembly mounted on a tongue of a draft implement having an input driveline, said assembly normally supporting said driveline in a predetermined longitudinally extending position for operative drive connection with a power shaft of a tractor or the like which tows the implement through an articulation connection with the implement tongue, said assembly comprising:

support means on the implement tongue;

a lower jaw part fixedly mounted on said support means;

an upper jaw part;

shaft means extending generally vertically through said lower jaw part and journalling said upper jaw part for rotation relative to said lower jaw part about a generally upright axis and for concurrent axial sliding movement toward and away from an intermeshed relationship with said lower jaw part;

each of said jaw parts including a plurality of pairs of planar sloping cam surfaces which extend radially from said generally upright axis defined by said shaft, said pairs on each of said jaw parts being disposed at generally equal angularly displaced distances one to the next, with said pairs on said upper jaw part being in opposed relationship and engaged with said pairs on said lower jaw part when said jaw parts are disposed in said intermeshed relationship and when said upper jaw part rotates relative to said lower jaw part away from said intermeshed relationship, one cam surface in each of the pairs thereof on said upper jaw part slides upwardly relative to and upon an opposing one cam surface in each of the pairs thereof on said lower jaw part;

a generally horizontal arm rigidly connected to said upper jaw part for movement therewith and being interconnected to and supporting said driveline; and resilient means for urging said upper jaw part downwardly toward said lower jaw part so as to normally maintain said upper jaw part in the intermeshed relationship with the lower jaw parts such that said arm will support said driveline in said predetermined longitudinal position, said resilient means being yieldable to allow said upper jaw part to concurrently rotate relative to, and axially slide away from said intermeshed relationship upon said lower jaw part between predetermined angularly displaced limits such that said arm will pivotally move laterally and allow lateral movement of said driveline therewith to accommodate sharp turns of the tractor relative to the implement.

4. An improved assembly as recited in claim 3, wherein said predetermined angularly displaced limits between which said upper jaw part may rotate relative to said lower jaw part are defined by a pair of angularly spaced apart elements projecting from said upper jaw part and a stop element stationarily mounted adjacent said lower jaw part spaced between and in the path of movement of said projecting elements with said upper jaw part so as to preclude said cam surfaces on said upper jaw part from indexing into a new intermeshing relationship relative to said cam surfaces on said lower jaw part when said upper jaw part is rotated.

* * * * *